United States Patent
Tsuda

(10) Patent No.: US 10,857,806 B2
(45) Date of Patent: Dec. 8, 2020

(54) LIQUID DISCHARGE APPARATUS, PROCESSING METHOD DETERMINING APPARATUS, PROCESSING METHOD DETERMINING METHOD, AND RECORDING MEDIUM

(71) Applicant: Masaaki Tsuda, Kanagawa (JP)

(72) Inventor: Masaaki Tsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/355,759

(22) Filed: Mar. 17, 2019

(65) Prior Publication Data

US 2019/0283446 A1 Sep. 19, 2019

(30) Foreign Application Priority Data

Mar. 19, 2018 (JP) .................................. 2018-051758

(51) Int. Cl.
  *B41J 2/21* (2006.01)
  *B41J 2/045* (2006.01)
  (Continued)

(52) U.S. Cl.
  CPC ......... *B41J 2/2132* (2013.01); *B41J 2/04535* (2013.01); *B41J 2/04541* (2013.01);
  (Continued)

(58) Field of Classification Search
  CPC .. B41J 2/2132; B41J 2/04535; B41J 2/04541; B41J 2/04558; G06K 15/107; G06K 15/1826; G06K 15/105
  See application file for complete search history.

(56) References Cited

U.S. PATENT DOCUMENTS

| 2007/0165068 A1 | 7/2007 | Tsuboi |
| 2007/0242098 A1 | 10/2007 | Sudo et al. |
| 2015/0283804 A1 | 10/2015 | Sato et al. |

FOREIGN PATENT DOCUMENTS

| JP | 2012-187859 | 10/2012 |
| JP | 2014-004736 | 1/2014 |

(Continued)

OTHER PUBLICATIONS

IP.com search (Year: 2020).*
Extended European Search Report dated Jul. 10, 2019 in Patent Application No. 19162106.9, 8 pages.

*Primary Examiner* — Lisa Solomon
(74) *Attorney, Agent, or Firm* — Oblon, McClelland, Maier & Neustadt, L.L.P.

(57) ABSTRACT

A liquid discharge apparatus includes a liquid discharge head, a conveyance device, an imaging device, and processing circuitry. The liquid discharge head is configured to discharge liquid to an object to form a liquid application surface. The conveyance device is configured to convey the object. The imaging device is configured to capture a plurality of positions of the object on which the liquid application surface is formed. The processing circuitry is configured to control discharge of the liquid by the liquid discharge head according to a plurality of pieces of different pattern data for forming the liquid application surface, control conveyance of the object by the conveyance device to form the liquid application surface corresponding to the pattern data, and determine a processing method of forming the liquid application surface according to captured images of the plurality of positions captured by the imaging device.

7 Claims, 9 Drawing Sheets

(51) Int. Cl.
*G06K 15/10* (2006.01)
*G06K 15/02* (2006.01)

(52) U.S. Cl.
CPC ........ *B41J 2/04558* (2013.01); *G06K 15/105* (2013.01); *G06K 15/107* (2013.01); *G06K 15/1826* (2013.01)

(56) References Cited

FOREIGN PATENT DOCUMENTS

| | | |
|---|---|---|
| JP | 2014-100854 | 6/2014 |
| JP | 2016-030359 | 3/2016 |
| JP | 2016-172379 | 9/2016 |

* cited by examiner

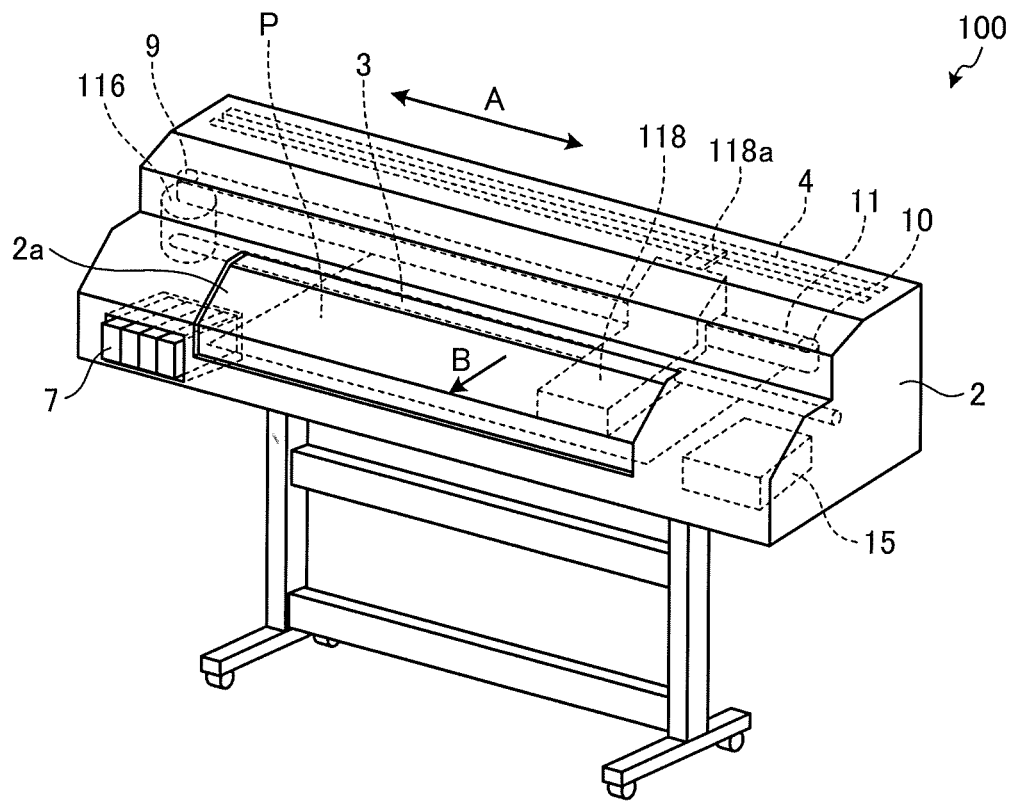
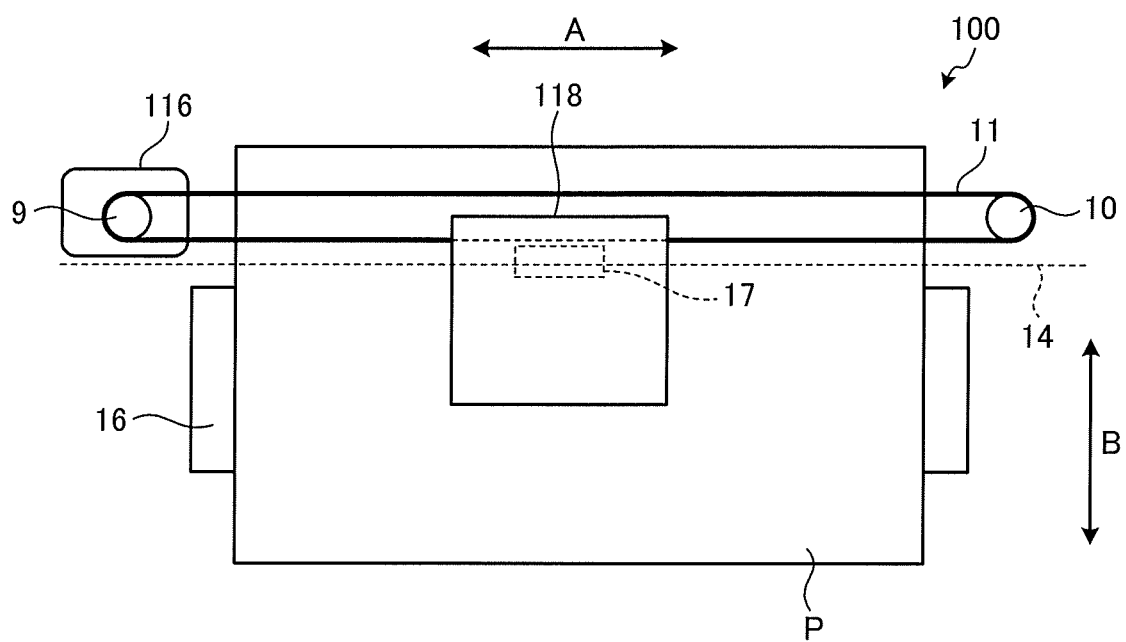

FIG. 7
IMAGE MASK
IMAGE MASK
FIG. 8
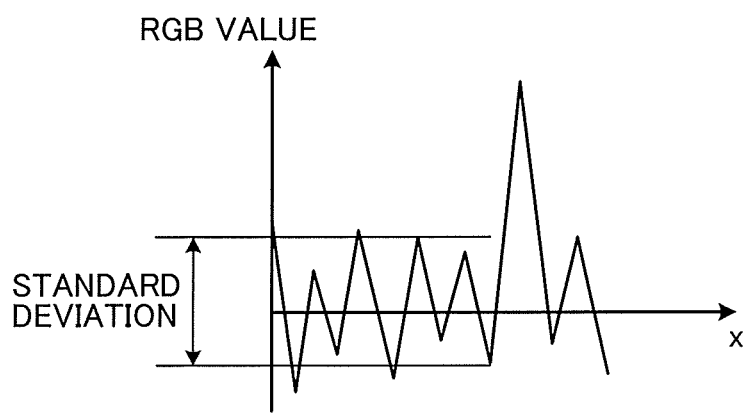

LIQUID DISCHARGE APPARATUS, PROCESSING METHOD DETERMINING APPARATUS, PROCESSING METHOD DETERMINING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2018-051758, filed on Mar. 19, 2018, in the Japan Patent Office, the entire disclosure of which is incorporated by reference herein.

BACKGROUND

Technical Field

Aspects of the present disclosure relates to a liquid discharge apparatus, a processing method determining apparatus, a processing method determining method, and a recording medium.

Related Art

An ink jet type printer is provided with a liquid discharge head including a plurality of nozzles for discharging liquid such as ink connected in a conveyance direction of a medium such as paper. In such a printer, operation of causing scanning of a liquid discharge head by one line, moving a medium by a predetermined amount, and then, causing scanning of the liquid discharge head by next one line is repeated to form a liquid application surface on the medium. In this way, when the formation of the liquid application surface is realized by a plurality of scans, a band-like density difference (banding or the like) for each scan sometimes occurs on the medium.

SUMMARY

In an aspect of the present disclosure, there is provided a liquid discharge apparatus that includes a liquid discharge head, a conveyance device, an imaging device, and processing circuitry. The liquid discharge head is configured to discharge liquid to an object to form a liquid application surface. The conveyance device is configured to convey the object. The imaging device is configured to capture a plurality of positions of the object on which the liquid application surface is formed. The processing circuitry is configured to control discharge of the liquid by the liquid discharge head according to a plurality of pieces of different pattern data for forming the liquid application surface, control conveyance of the object by the conveyance device to form the liquid application surface corresponding to the pattern data, and determine a processing method of forming the liquid application surface according to captured images of the plurality of positions captured by the imaging device.

In another aspect of the present disclosure, there is provided a processing method determining apparatus that includes processing configured to acquire captured images obtained by capturing a plurality of positions of an object on which a liquid application surface is formed according to a plurality of pieces of different pattern data; and determine a processing method of forming the liquid application surface according to captured images acquired.

In still another aspect of the present disclosure, there is provided a non-transitory recording medium storing a plurality of instructions which, when executed by one or more processors, cause the processors to perform a method, the method comprising acquiring captured images obtained by capturing a plurality of positions of an object on which a liquid application surface is formed according to a plurality of pieces of different pattern data; and determining a processing method of forming the liquid application surface according to captured images acquired by the acquiring.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a perspective view of a liquid discharge apparatus according to a first embodiment;

FIG. 2 is a top view illustrating a mechanical configuration of an inside of the liquid discharge apparatus according to the first embodiment;

FIG. 7 is a diagram illustrating an example of pattern data forming an overlapping portion according to the first embodiment;

FIG. 8 is a diagram illustrating an example of measurement results of red, green, blue (RGB) values according to the first embodiment;

Figure 3:
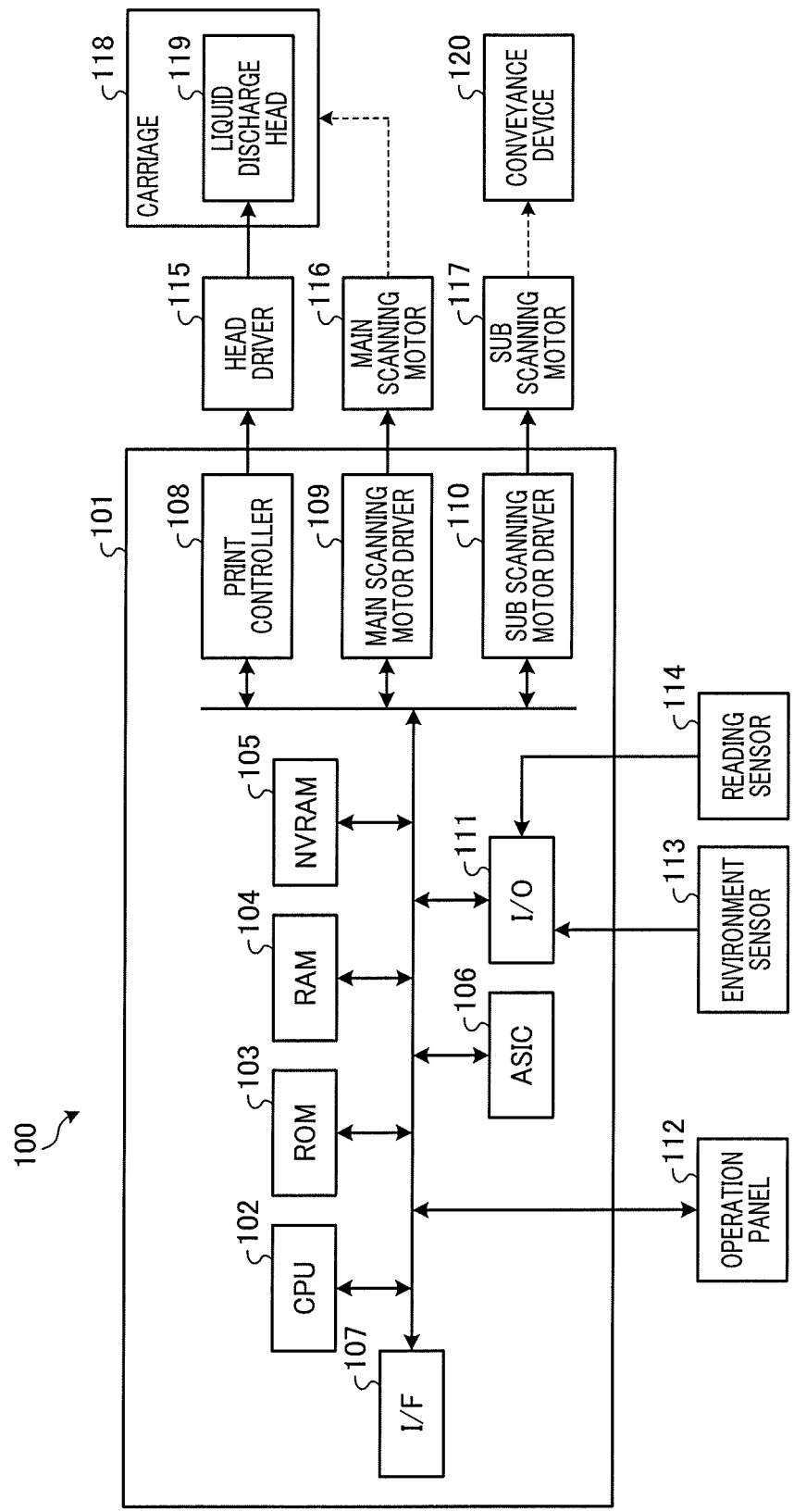
FIG. 3 is a block diagram illustrating an example of a hardware configuration of the liquid discharge apparatus according to the first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a liquid discharge apparatus, a processing method determining apparatus, and a processing method determining program according to the present invention will be described below with reference to the accompanying drawings. The present invention is not limited to the following embodiments. The embodiments can be appropriately combined within a range not contradicting the contents.

First Embodiment

A mechanical configuration of a liquid discharge apparatus 100 according to a first embodiment will be described referring to FIGS. 1 and 2. FIG. 1 is a perspective view of the liquid discharge apparatus 100 according to a first embodiment. FIG. 2 is a top view illustrating a mechanical configuration of an inside of the liquid discharge apparatus 100 according to the first embodiment.

As illustrated in FIG. 1, the liquid discharge apparatus 100 includes a carriage 118 to reciprocate in a main scanning direction (a direction of an arrow A in the drawing). The carriage 118 is supported by a main guide rod 3 extending along the main scanning direction. The carriage 118 is provided with a connecting piece 118a. The connecting piece 118a is engaged with a sub guide member 4 provided in parallel with the main guide rod 3, and stabilizes the posture of the carriage 118.

The carriage 118 is connected to a timing belt 11 that is stretched between a driving pulley 9 and a driven pulley 10. The driving pulley 9 rotates by driving of a main scanning motor 116. The driven pulley 10 has a mechanism to adjust the distance between the driven pulley 10 and the driving pulley 9, and has a role of giving a predetermined tension to the timing belt 11. Feeding operation of the timing belt 11 is carried out by driving of the main scanning motor 116 so that the carriage 118 reciprocates in the main scanning direction. As illustrated in FIG. 2, for example, the movement amount and the movement speed of the carriage 118 are controlled according to an encoder value outputted by a main scanning encoder sensor 17 provided on the carriage 118 by detecting a mark on an encoder sheet 14.

A liquid discharge head 119 (see FIG. 3) is mounted on the carriage 118. The liquid discharge head 119 has a nozzle row in which a plurality of nozzles that discharge ink of colors such as yellow (Y), cyan (C), magenta (M), and black (K) in a sub-scanning direction (a direction of an arrow B in the drawing) are arranged. Note that the color of ink discharged by the liquid discharge head 119 and the number of nozzle rows are not limited to this. The liquid discharge head 119 is supported by the carriage 118 so that the discharge surface (nozzle surface) of liquid such as ink is directed downward (toward the medium P). The liquid discharge head 119 discharges liquid such as ink onto a medium P according to data (input data) input to the liquid discharge apparatus 100 to form a liquid application surface.

The cartridge 7, which is a supply member for supplying liquid such as ink to the liquid discharge head 119, is not mounted on the carriage 118 but is arranged at a predetermined position of the liquid discharge apparatus 100. The cartridge 7 and the liquid discharge head 119 are connected by a pipe or the like, and liquid such as ink is supplied from the cartridge 7 to the liquid discharge head 119 via this pipe.

As illustrated in FIG. 2, a platen 16 is provided at a position facing the discharge surface of the liquid discharge head 119. The platen 16 is for supporting the medium P when ink is discharged from the liquid discharge head 119 onto the medium P. For example, the platen 16 is provided with a large number of through holes penetrating in the thickness direction, and rib-shaped protrusions are formed so as to surround the individual through holes. Then, a suction fan provided on the side opposite to the surface supporting the medium P of the platen 16 is operated, so that the medium P is prevented from dropping from above the platen 16. The medium P is nipped by a conveyance roller driven by a sub scanning motor 117 (see FIG. 3) and is intermittently conveyed on the platen 16 in the sub-scanning direction (a direction of an arrow B in the drawing).

As described above, the liquid discharge head 119 is provided with a plurality of nozzles arranged in the sub-scanning direction. The liquid discharge apparatus 100 intermittently conveys the medium P in the sub-scanning direction, and during stop of the conveyance of the medium P, while the carriage 118 is reciprocated in the main scanning direction, the nozzles of the liquid discharge head 119 is selectively driven according to the input data, and liquid such as ink is discharged from the liquid discharge head 119 to the medium P on the platen 16 to form the liquid application surface on the medium P.

Here, the medium P means a liquid adherable material, that is, one to which liquid can be adhered at least temporarily, adhered and fastened, adhered and permeated, or the like. Specific examples include a recording medium of paper, a recording sheet, recording paper, a film, or a cloth, an electronic component such as an electronic substrate or a piezoelectric element, and a recording medium such as a powder material layer (powder layer), organ model, or an inspection cell, and unless specifically limited, include everything to which liquid adheres. The material of above-mentioned "liquid adherable material" may be any material such as paper, thread, fiber, cloth, leather, metal, plastic, glass, wood, ceramics or the like as long as liquid can adhere to the material even temporarily. In the liquid discharge apparatus 100 according to the present embodiment, an image is formed (printed) on a sheet which is an example of the medium P.

Returning to FIG. 1, the liquid discharge apparatus 100 includes a maintenance mechanism 15 to maintain the reliability of the liquid discharge head 119. The maintenance mechanism 15 performs cleaning or capping of the discharge surface of the liquid discharge head 119, discharge of unnecessary ink from the liquid discharge head 119, or the like.

Each of the constituent elements described above constituting the liquid discharge apparatus 100 are arranged inside an exterior body 2. A cover member 2a is provided in the exterior body 2 so as to be openable and closable. At the time of maintenance of the liquid discharge apparatus 100 or when a paper jam occurs, the cover member 2a is opened, so that work can be performed on each constituent element provided inside the exterior body 2.

Next, a hardware configuration of the liquid discharge apparatus 100 according to a first embodiment will be described referring to FIG. 3. FIG. 3 is a block diagram illustrating an example of a hardware configuration of the liquid discharge apparatus 100 according to the first embodiment.

As illustrated in FIG. 3, the liquid discharge apparatus 100 includes a controller 101. The liquid discharge apparatus 100 includes a central processing unit (CPU) 102 to control the entire apparatus. The liquid discharge apparatus 100 includes a read only memory (ROM) 103, a random access memory (RAM) 104, a non-volatile memory (NVRAM) 105, an application specific integrated circuit (ASIC) 106 connected to the CPU 102.

The ROM 103 stores programs to be executed by the CPU 102, other fixed data, or the like. The RAM 104 temporarily stores image data or the like. The nonvolatile memory 105 holds data even while the power of the liquid discharge apparatus 100 is cut off. The ASIC 106 processes image processing for performing various signal processing, rearrangement, or the like, or other input and output signals for controlling the entire apparatus.

The controller 101 includes an interface (I/F) 107, a print controller 108, a main scanning motor driver 109, a sub scanning motor driver 110, and an input/output (I/O) 111. The controller 101 is connected with an operation panel 112, an environment sensor 113, and a reading sensor 114.

The I/F 107 is an interface for exchanging data and signals with a host side. Specifically, the I/F 107 receives print data or the like generated by a printer driver of a host such as an information processing apparatus, an image reading apparatus, an imaging apparatus, or the like via a cable, a network, or the like. That is, the generation and output of print data to the controller 101 may be performed by the printer driver on the host side. The CPU 102 reads and analyzes the print data in the reception buffer included in the I/F 107. Then, the ASIC 106 performs image processing, data rearrangement processing, or the like, and the image data is transferred to the print controller 108 or a head driver 115.

The print controller 108 generates drive waveforms for driving the liquid discharge head 119, and outputs image data for selectively driving a pressure generator to generate pressure for the liquid discharge head 119 to discharge liquid from the nozzle and various types of data associated with the image data to the head driver 115.

The print controller 108 may have a computer configuration including a CPU, a ROM, a RAM, or the like. The CPU executes the program stored in the ROM or the like so that the print controller 108 executes a desired function.

The program executed by the CPU of the print controller 108 can be provided by being recorded in a recording medium that can be read by a computer such as a compact disc (CD)-ROM, a flexible disk (FD), a CD-R, a digital versatile disk (DVD) or the like in a file in installable format or executable format.

The program executed by the CPU of the print controller 108 may be stored on a computer connected to a network such as the Internet and provided by being downloaded via the network. The program executed by the CPU of the print controller 108 may be provided or distributed via a network such as the Internet.

The main scanning motor driver 109 drives the main scanning motor 116. The main scanning motor 116 moves the carriage 118 having the liquid discharge head 119 in the main scanning direction by driving. The sub scanning motor driver 110 drives the sub scanning motor 117. The sub scanning motor 117 operates the conveyance device 120 (for example, the above-described conveyance roller or the like) that conveys the object (for example, the medium P) to be a target of the liquid discharge by the liquid discharge head 119, by driving.

The I/O 111 acquires information from the environment sensor 113 or the reading sensor 114, and extracts information required for controlling each part of the liquid discharge apparatus 100. For example, the environment sensor 113 detects environmental temperature, environmental humidity, or the like. The reading sensor 114 is a two-dimensional sensor that images a predetermined position of the medium P on which the liquid application surface is formed. The reading sensor 114 corresponds to the "imaging device". Note that the I/O 111 also inputs information from various sensors other than the environment sensor 113 and the reading sensor 114. The operation panel 112 inputs and displays various types of information.

Here, the outline of the print control processing in the liquid discharge apparatus 100 will be described.

The CPU 102 of the liquid discharge apparatus 100 reads and analyzes the print data in the reception buffer of the I/F 107, performs necessary image processing, data rearrangement processing, or the like in the ASIC 106, and transfers the data to the print controller 108.

The print controller 108 outputs the image data and the drive waveform to the head driver 115 at a required timing. Specifically, the print controller 108 performs digital analog (D/A) conversion on the pattern data of the drive pulse stored in the ROM 103 and read out by the CPU 102 and amplifies the pattern data so as to generate a drive waveform including one drive pulse or a plurality of drive pulses.

Note that image data (for example, dot pattern data) for outputting an image may be generated by storing font data in, for example, the ROM 103, or by developing the image data into a bitmap with a printer driver on the host side and transferring the developed data to the liquid discharge apparatus 100.

The head driver 115 selectively applies the drive pulse forming the drive waveform supplied from the print controller 108 to the pressure generator of the liquid discharge head 119 according to the input image data (for example, dot pattern data) to drive the liquid discharge head 119.

Figure 4A:
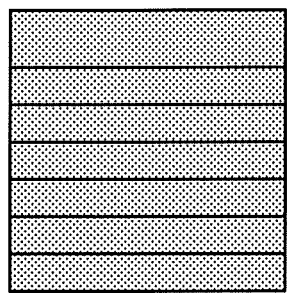
FIG. 4A is a diagram illustrating an example of image defects in which line-shaped streaks are generated.
Figure 4B:
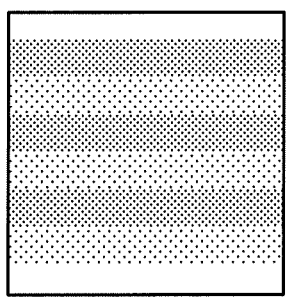
FIG. 4B is a diagram illustrating an example of image defects in which band-like images having different densities are generated.

Next, an image defect will be described with reference to FIGS. 4A and 4B. FIG. 4A is a diagram illustrating an example of image defects in which line-shaped streaks are generated. FIG. 4B is a diagram illustrating an example of image defects in which band-like images having different densities are generated.

As illustrated in FIG. 4A, in the case of forming an image by the inkjet method, there is a possibility of an image defect in which line-like streaks of white or darkened color is generated in the direction of scanning the liquid discharge head 119. As illustrated in FIG. 4B, in the case of forming an image by the ink jet method, there is a possibility of an image defect in which a strong density portion and a weak density portion are generated alternately in a band-like shape in the direction of scanning the liquid discharge head 119. These image defects are often generated at regular intervals in the direction in which the medium P is conveyed. These image defects sometimes occur when a boundary of a liquid application surface formed by continuous scanning of the liquid discharge head 119 or a liquid application surface is formed in multiple layers. In the present embodiment, a portion including the boundary of the liquid application surface and a portion where the liquid application surface is formed in multiple layers are referred to as a "connection processing range" in some cases.

The image defects are caused by a factor that an error occurs in the conveyance amount and the position of the dot deviates when the medium P is conveyed, a factor that the size of the discharged ink droplet is small due to unstable discharge of some nozzles, a factor that the discharge speed is slow and the landing position is deviated, or the like. When such an image defect occurs in a solid portion, the variance or the difference value between the maximum peak value and the minimum peak value is large in terms of a corresponding feature quantity (for example, RGB value or the like). In the present embodiment, these pieces of data are compared, so that an image processing method capable of suppressing image defects is found out. These factors may be generated depending on the use environment or the like even though they do not occur early, and the degree of image defects generated may be improved or may be worse in some cases.

Therefore, in the present embodiment, a liquid application surface is formed on the medium P according to a plurality of pieces of different pattern data, a predetermined position where there is a possibility of occurrence of image defect is captured by the reading sensor 114, and an image processing method for suppressing the image defects is determined according to the captured image. The predetermined position includes the connection processing range described above.

Figure 5:
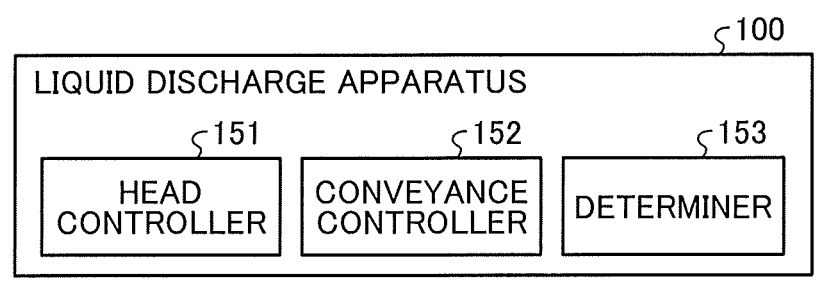
FIG. 5 is a block diagram illustrating a functional configuration example of the liquid discharge apparatus according to the first embodiment.

Next, a function configuration of the liquid discharge apparatus 100 according to a first embodiment will be described referring to FIG. 5. FIG. 5 is a block diagram illustrating a functional configuration example of the liquid discharge apparatus 100 according to the first embodiment.

As illustrated in FIG. 5, the liquid discharge apparatus 100 includes a head controller 151, a conveyance controller 152, and a determiner 153.

The head controller 151 controls discharge of liquid by the liquid discharge head 119. More specifically, the head controller 151 controls the liquid discharge by the liquid discharge head 119 according to a plurality of pieces of different pattern data (for example, image data such as the above-described dot pattern data) for forming a liquid application surface on the medium P. The pattern data corresponds to each pattern in which image defects may occur. Details of the pattern data will be described later. The head controller 151 is one of the functions of the print controller 108 and the head driver 115.

The conveyance controller 152 controls conveyance of the medium P by the conveyance device 120. More specifically, the conveyance controller 152 controls conveyance of the medium P by the conveyance device 120 so that a liquid application surface corresponding to the pattern data is formed. For example, the conveyance controller 152 instructs the sub scanning motor driver 110 of the conveyance amount of the medium P so that a liquid application surface corresponding to the pattern data is formed.

Depending on the pattern data, the conveyance controller 152 controls conveyance of the medium P by the conveyance device 120 so that, for example, an overlapping portion where a part of the liquid application surface overlaps by continuous scanning of the liquid discharge head 119 is formed. For example, the overlapping portion is formed by continuous scanning of the liquid discharge head 119 according to pattern data including a mask in which the dot generation rates are different and dots are randomly generated. Therefore, the reading sensor 114 may capture a predetermined position including the overlapping portion.

The determiner 153 determines a processing method of forming a liquid application surface according to the captured image. More specifically, the determiner 153 measures feature quantities such as RGB values from the captured images of the predetermined position of the medium P captured by the reading sensor 114 (which may include the above-described "overlapping portion"), and determines the processing method of forming a liquid application surface with better quality. As described above, if the variance between the RGB values or the difference value between the maximum peak value and the minimum peak value is large, there is a possibility that an image defect has occurred. Therefore, the determiner 153 determines a processing method of forming a liquid application surface with better quality according to the standard deviation of the RGB values and the difference value between the maximum peak value and the minimum peak value of the RGB values.

For example, when the standard deviation is Dev and the difference value is Pe, the determiner 153 selects pattern data in which Dev+Pe is the smallest value (less variance or error) and sets various conditions at the time of formation of the liquid application surface based on the pattern data as a processing method of forming a liquid application surface with better quality (optimum condition). The forming processing method determined by the determiner 153 can be fed back as a condition for printing in the next and subsequent times.

Figure 6:
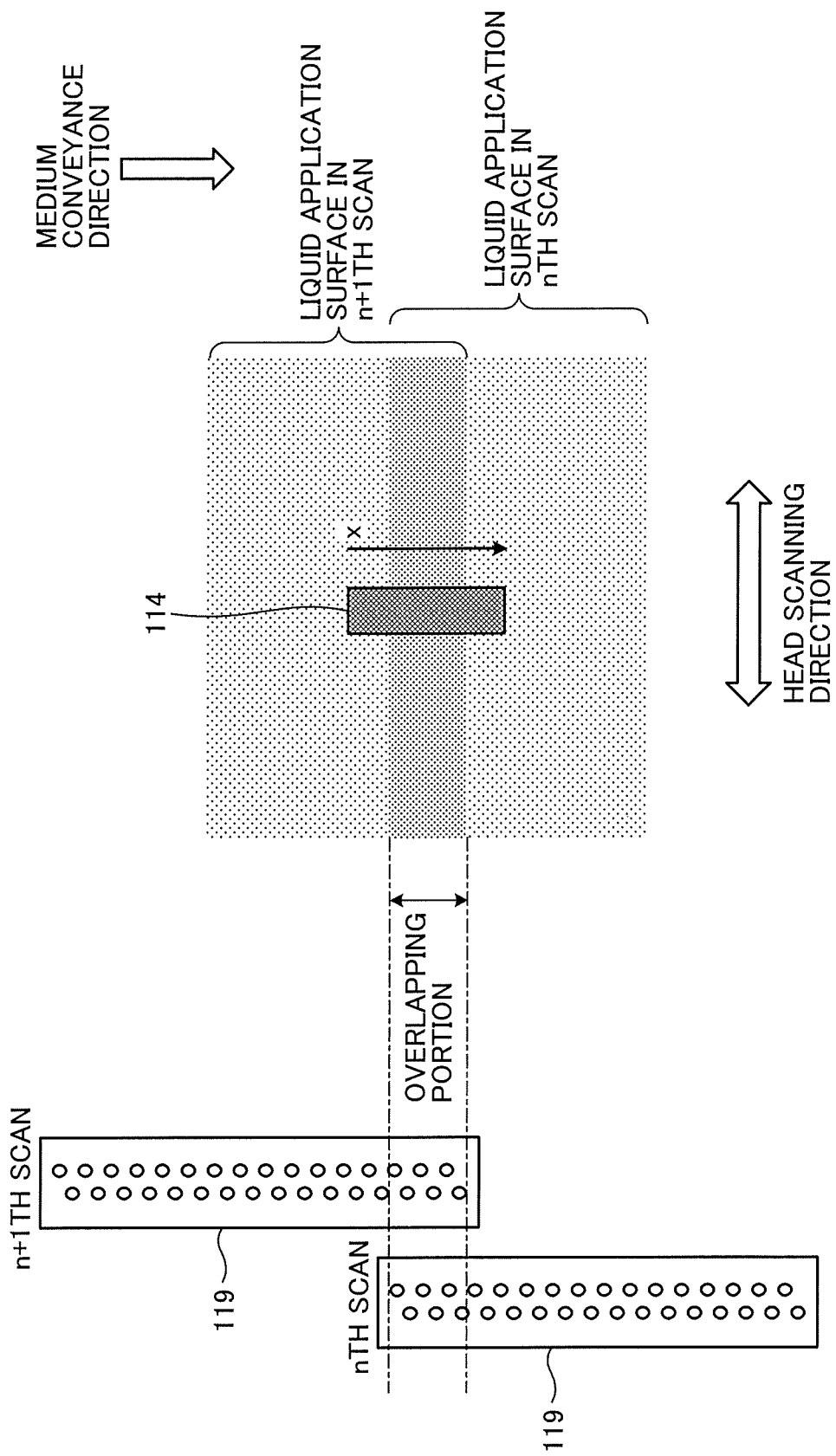
FIG. 6 is a diagram for explaining an example of forming an overlap portion by using pattern data according to the first embodiment.

Next, a case of forming an overlap portion by using pattern data according to the first embodiment will be described referring to FIG. 6. FIG. 6 is a diagram for explaining an example of forming an overlap portion by using pattern data according to the first embodiment.

As illustrated in FIG. 6, the liquid discharge head 119 forms the liquid application surface of the nth scan on the medium P under the control of the head controller 151. Thereafter, the liquid discharge head 119 forms on the medium P the liquid application surface of the n+1th scan which is the scan which is continuous with the nth scan. At this time, the conveyance controller 152 controls the conveyance of the medium P such that a part of the liquid application surface is multi-layered in the nth scan and the n+1th scan. As a result, an overlapping portion is formed on the medium P. FIG. 6 illustrates an example in which an overlapping portion is formed by six nozzles on the upstream side of the liquid discharge head 119 with respect to the conveyance direction of the medium P in the nth scan, and an overlapping portion is formed by six nozzles on the downstream side of the liquid discharge head 119 with respect to the conveyance direction of the medium P in the n+1th scan. The reading sensor 114 captures a predetermined position including the overlapping portion formed in this way. Note that x indicates the position on the medium P (see FIG. 8).

FIG. 7 is a diagram illustrating an example of pattern data forming an overlapping portion according to the first embodiment.

As illustrated in FIG. 7, the overlapping portion includes dots discharged from both the nozzle on the upstream side of the liquid discharge head 119 in the nth scan and the nozzle on the downstream side of the liquid discharge head 119 in the n+1th scan. For example, in the overlapping portion, the dot occurrence rate is gradually reduced from 90% to 10% in the sub-scanning direction, and a randomly generated mask is applied, such that the dot occurrence rate when dots on the upstream side and the downstream side are combined is 100%. Further, for example, the width of the mask in the main scanning direction is set to four times or more the width in the sub-scanning direction such that the repetitive pattern is inconspicuous.

As a method of detecting an image defect when the liquid application surface is formed on the medium P by such scanning of the liquid discharge head 119, the RGB values of the captured image obtained by capturing the predetermined position including the overlapping portion with the reading sensor 114 are measured. At that time, as RGB values are taken in the x direction (see FIG. 6), the result is obtained as the graph illustrated in FIG. 8.

FIG. 8 is a diagram illustrating an example of measurement results of RGB values according to the first embodiment.

As illustrated in FIG. 8, in the case of an image defect in which a stripe is generated in the overlapping portion, the peak value of the graph appears large. In the case of an image defect in which density unevenness occurs in the overlapping portion, a fine variation component appears and the standard deviation becomes large. Therefore, the determiner 153 can detect an image defect peculiar to the overlapping portion by reading these values.

Figure 9:
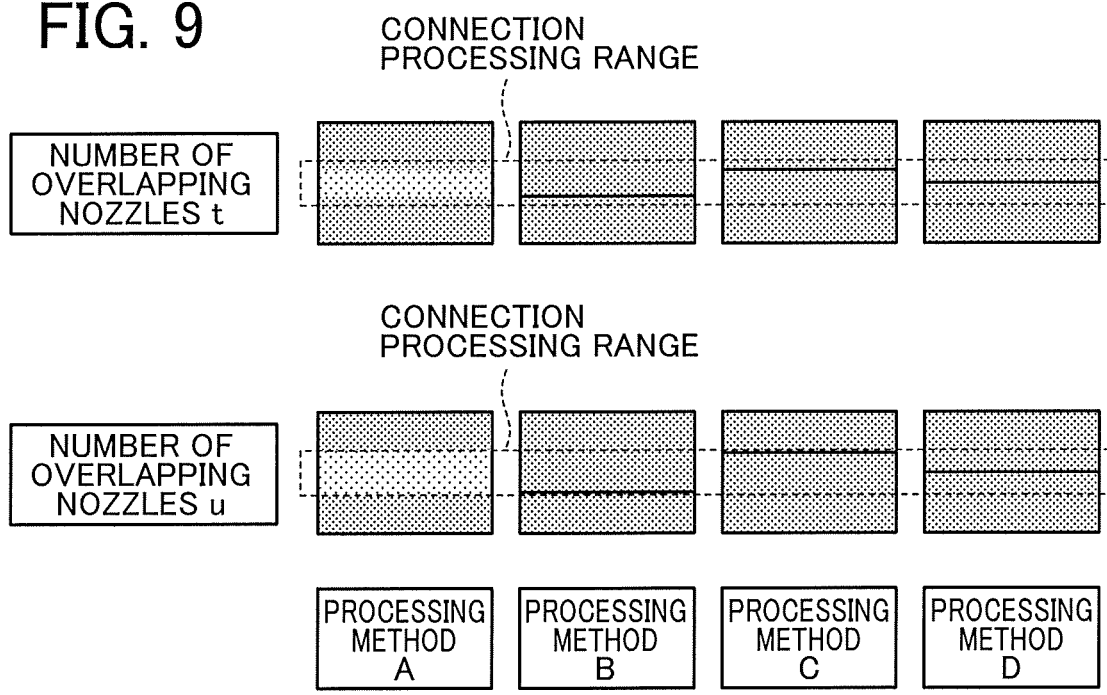
FIG. 9 is a diagram for explaining an example of determining a processing method of forming a liquid application surface according to the first embodiment.

FIG. 9 is a diagram for explaining an example of determining a processing method of forming a liquid application surface according to the first embodiment. In FIG. 9, the number of overlapping nozzles refers to the number of nozzles used to form the overlapping portion by discharge of liquid in the nth scan and the n+1th scan. For example, in FIG. 6 described above, the number of overlapping nozzles is "6". The relationship between t and u representing the number of overlapping nozzles is t<u. Note that the broken line frame illustrated in FIG. 9 represents the connection processing range. An overlapping portion may be included in the connection processing range.

As illustrated in FIG. 9, a processing method A represents processing performed using the pattern data illustrated in FIG. 7. In the processing method A, since a mask is applied, streaks and density unevenness are less likely to occur. In a processing method B, the dot occurrence rate of the liquid discharge head 119 in the n+1th scan is set to 100%. A line included in the connection processing range of the processing method B represents a streak. The streak in the processing method B may occur on the downstream side in the conveyance direction of the medium P.

In a processing method C, the dot occurrence rate of the liquid discharge head 119 in the nth scan is set to 100%. A line included in the connection processing range of the processing method C represents a streak. The streak in the processing method C may occur on the upstream side in the conveyance direction of the medium P. In a processing method D, the dot occurrence rate of the liquid discharge head 119 in the nth scan is set to 50%, and the dot occurrence rate of the liquid discharge head 119 in the n+1th scan is set to 50%. A line included in the connection processing range of the processing method D represents a streak. The streak in the processing method D may occur in the almost center of the connection processing range of the medium P. The type of the processing method and the number of overlapping nozzles are not limited to those described above.

The determiner 153 measures the RGB values from the captured images of the predetermined position of the medium P on which the liquid application surface is formed according to each processing method and each number of overlapping nozzle, and calculates the standard deviation Dev+difference value Pe. Then, the determiner 153 selects pattern data in which the calculated value is the smallest value and sets various conditions at the time of formation of the liquid application surface based on the selected pattern data as a processing method of forming a liquid application surface with better quality (optimum condition). For example, when the value of Dev+Pe is the minimum in the pattern data illustrated in the lower left portion of FIG. 9, in the optimum condition, the processing method is A and the number of overlapping nozzles is u.

The processing method B, the processing method C, and the processing method D are processing methods that may cause a streak in the connection processing range, and there is also a case where the quality of the liquid application surface is better with no mask applied as the processing method A depending on the characteristics of the liquid discharge head 119. For this reason, in the present embodiment, formation of the liquid application surface corresponding to various liquid processing methods and the number of overlapping nozzles is performed.

Figure 10:
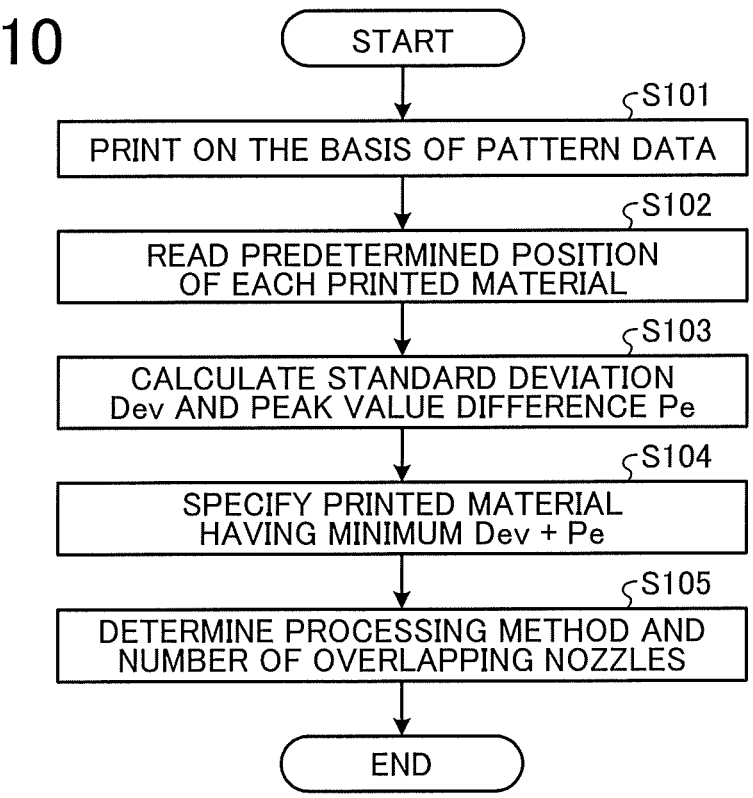
FIG. 10 is a flowchart illustrating an example of a flow of processing by the liquid discharge apparatus according to the first embodiment.

Next, a flow of processing of the liquid discharge apparatus 100 according to a first embodiment will be described referring to FIG. 10. FIG. 10 is a flowchart illustrating an example of a flow of processing by the liquid discharge apparatus 100 according to the first embodiment.

As illustrated in FIG. 10, the liquid discharge apparatus 100 performs printing according to a plurality of pieces of different pattern data (step S101). Then, the liquid discharge apparatus 100 captures images of predetermined positions of each of the printed materials (step S102). Subsequently, the liquid discharge apparatus 100 measures the RGB values of the captured image obtained by capturing the predetermined positions, and calculates the standard deviation Dev of the RGB values, and the difference value Pe between the maximum peak value and the minimum peak value of the RGB value (step S103).

Thereafter, the liquid discharge apparatus 100 specifies a printed material having the minimum standard deviation Dev+difference value Pe (step S104). Then, the liquid discharge apparatus 100 determines the processing method and the number of overlapping nozzles when a printed material having the minimum standard deviation Dev+difference value Pe is printed as an image forming processing method of a printed material with better quality (step S105).

As described above, the liquid discharge apparatus 100 forms a liquid application surface on the medium P based on a plurality of pieces of different pattern data, and measures the RGB values of the captured image obtained by capturing the predetermined position where the liquid application surface is formed. Then, the liquid discharge apparatus 100 selects pattern data in which the value of the standard deviation Dev+difference value Pe is the minimum from the standard deviation Dev of the RGB values and the difference value Pe between the maximum peak value and the minimum peak value of the RGB values. The liquid discharge apparatus 100 determines the number of overlapping nozzles and the processing method at the time of formation of the liquid application surface based on the selected pattern data as a processing method of forming a liquid application surface with better quality. As a result, the liquid discharge apparatus 100 can output suitable conditions for suppressing image defects even when use environments or the like are different.

Second Embodiment

In the first embodiment, a case has been described where the liquid discharge apparatus 100 determines the processing method of forming a liquid application surface with better quality. Determination of a processing method of forming a liquid application surface with better quality may be performed by an external device connected to the liquid discharge apparatus 100. In a second embodiment, a case will be described where the external device connected to the liquid discharge apparatus 100 determines the processing method of forming a liquid application surface with better quality. In the second embodiment, the same reference numerals are given to the same configurations as those in the first embodiment, and the detailed explanation may be omitted in some cases.

Figure 11:
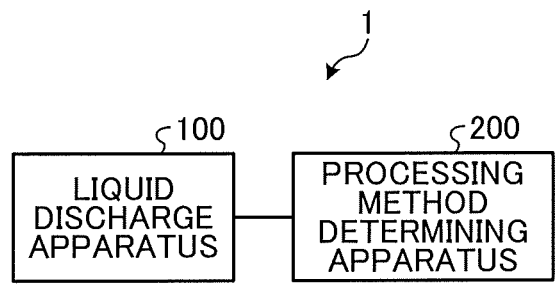
FIG. 11 is a diagram illustrating a system configuration example of a printing system according to a second embodiment.

FIG. 11 is a diagram illustrating a system configuration example of a printing system 1 according to the second embodiment.

As illustrated in FIG. 11, the printing system 1 includes the liquid discharge apparatus 100 and a processing method determining apparatus 200.

The liquid discharge apparatus 100 performs processing of forming a liquid application surface on the medium P based on a plurality of pieces of different pattern data by each constituent element described in the first embodiment, and capturing the predetermined position of the medium P where the liquid application surface is formed. In the second embodiment, the liquid discharge apparatus 100 transmits each captured image obtained by capturing the predetermined position to the processing method determining apparatus 200.

The processing method determining apparatus 200 performs processing of acquiring each captured image obtained by capturing the predetermined position from the liquid discharge apparatus 100, and determining a processing method of forming a liquid application surface with better quality according to each of the acquired captured images. For example, the processing method determining apparatus 200 is an information processing apparatus such as a personal computer (PC).

Figure 12:
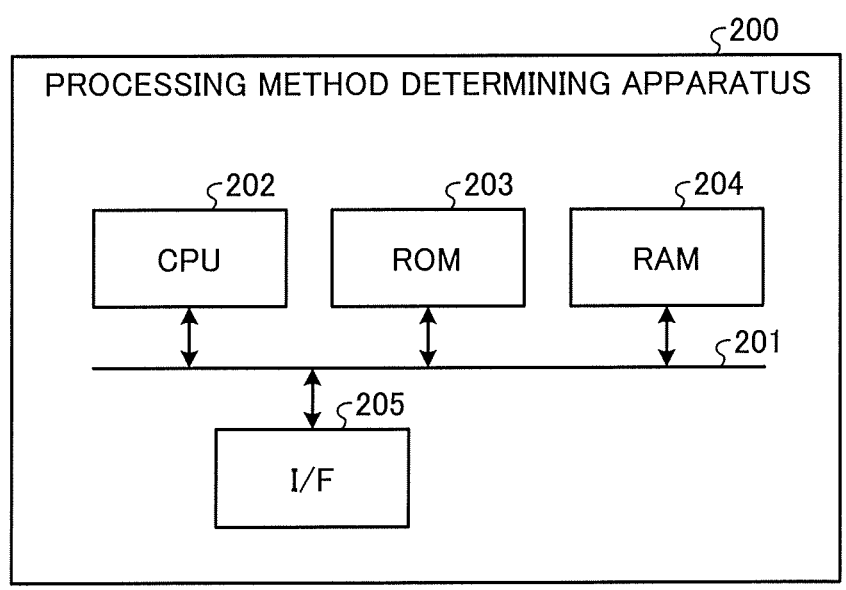
FIG. 12 is a block diagram illustrating an example of a hardware configuration of a processing method determining apparatus according to the second embodiment.

FIG. 12 is a block diagram illustrating an example of a hardware configuration of the processing method determining apparatus 200 according to the second embodiment.

As illustrated in FIG. 12, the processing method determining apparatus 200 includes a CPU 202, a ROM 203, a RAM 204, and an I/F 205. The above-described parts are mutually connected via a bus 201.

The CPU 202 executes a program stored in the ROM 203 or the like with the RAM 204 or the like as a work area to comprehensively control the operation of the processing method determining apparatus 200. The I/F 205 is an interface for exchanging various types of information with an external device (for example, the liquid discharge apparatus 100 or the like) connected to the processing method determining apparatus 200.

Figure 13:
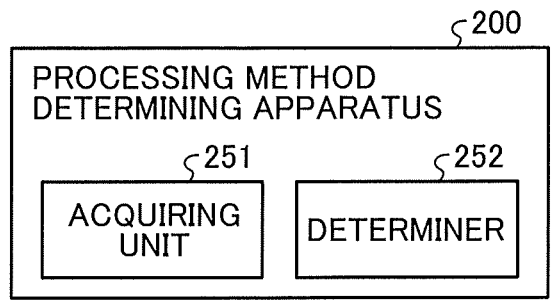
FIG. 13 is a block diagram illustrating an example of a functional configuration of the processing method determining apparatus according to the second embodiment.

Next, a function configuration of the processing method determining apparatus 200 according to the second embodiment will be described referring to FIG. 13. FIG. 13 is a block diagram illustrating an example of a functional configuration of the processing method determining apparatus 200 according to the second embodiment.

As illustrated in FIG. 13, the processing method determining apparatus 200 includes an acquiring unit 251 and a determiner 252.

The acquiring unit 251 acquires a captured image obtained by capturing a predetermined position of each object on which the liquid application surface is formed according to a plurality of pieces of different pattern data. As similar to the first embodiment, the liquid discharge apparatus 100 according to the second embodiment forms a liquid application surface on the medium P according to a plurality of pieces of different pattern data, and captures the predetermined position of the medium P where the liquid application surface is formed to obtain a captured image obtained by capturing the predetermined position. The acquiring unit 251 acquires each captured image obtained by the liquid discharge apparatus 100 in this way.

The determiner 252 determines a processing method of forming a liquid application surface according to the captured image. More specifically, the determiner 252 measures feature quantities such as RGB values from each captured image acquired by the acquiring unit 251, and determines a processing method of forming a liquid application surface with better quality according to the difference value Pe between the standard deviation Dev of the RGB values, and the maximum peak value and the minimum peak value of the RGB values. The detailed processing by the determiner 252 is similar to the processing by the determiner 153 described in the first embodiment.

Figure 14:
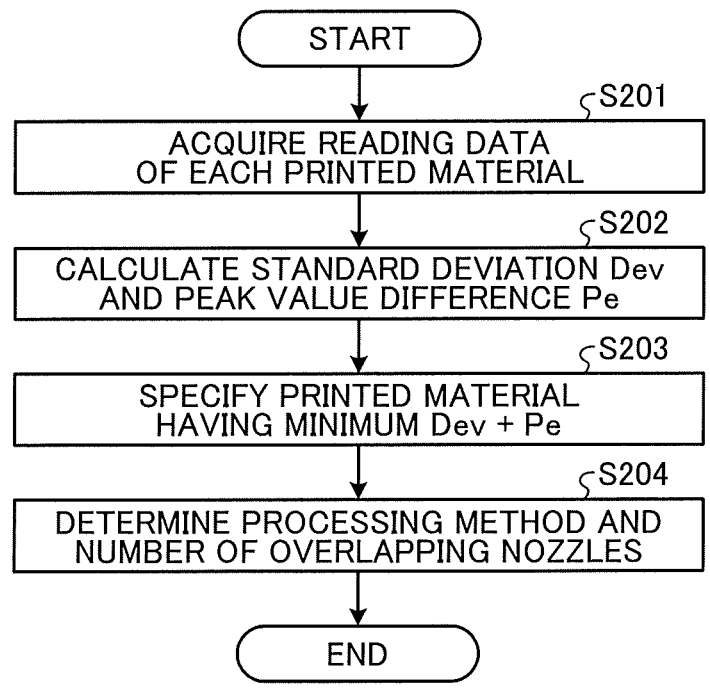
FIG. 14 is a flowchart illustrating an example of a flow of processing by the processing method determining apparatus according to the second embodiment.

Next, a flow of processing of the processing method determining apparatus 200 according to the second embodiment will be described referring to FIG. 14. FIG. 14 is a flowchart illustrating an example of a flow of processing by the processing method determining apparatus 200 according to the second embodiment.

As illustrated in FIG. 14, the processing method determining apparatus 200 acquires each captured image obtained by capturing a predetermined position of the medium P (step S201). The processing method determining apparatus 200 measures the RGB values of the captured image obtained by capturing the predetermined positions, and calculates the standard deviation Dev of the RGB values, and the difference value Pe between the maximum peak value and the minimum peak value of the RGB value (step S202). Subsequently, the processing method determining apparatus 200 specifies a printed material having the minimum standard deviation Dev+difference value Pe (step S203). Subsequently, the processing method determining apparatus 200 determines the processing method and the number of overlapping nozzles when a printed material having the minimum standard deviation Dev+difference value Pe is printed as an image forming processing method of a printed material with better quality (step S204).

As described above, the processing method determining apparatus 200 acquires a captured image obtained by capturing a predetermined position of each medium P on which the liquid application surface is formed according to a plurality of pieces of different pattern data, and determines a processing method of forming a liquid application surface according to each of the acquired captured images. As a result, the processing method determining apparatus 200 can output suitable conditions for suppressing image defects even when use environments are different.

Modification

In the above embodiments, a case where the liquid application surface is formed by continuous scanning of the liquid discharge head 119 has been described. The formation of the liquid application surface is not limited to this, and may be realized by a plurality of liquid discharge heads 119, for example.

Figure 15:
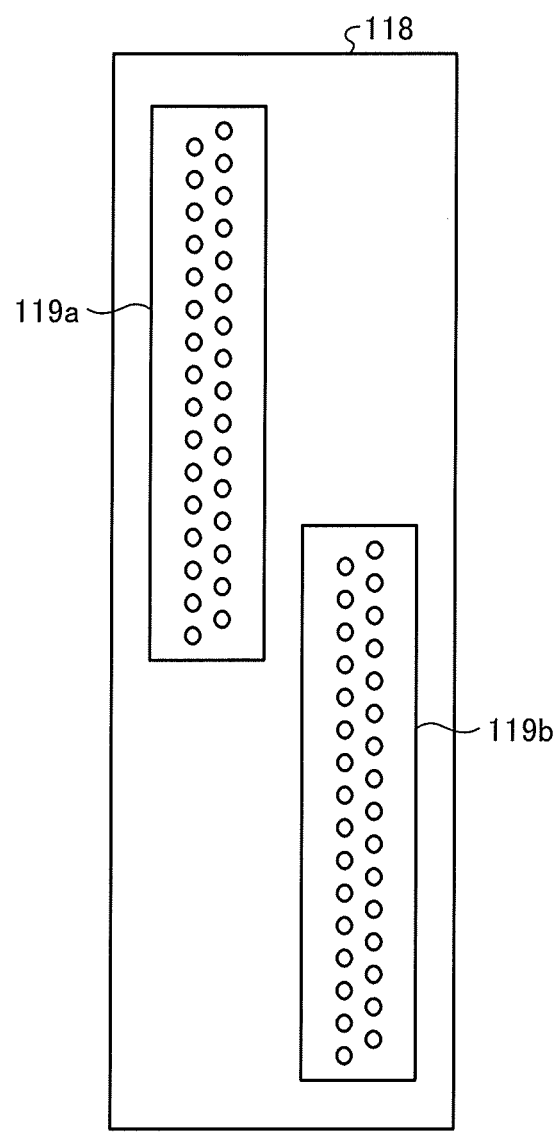
FIG. 15 is a diagram illustrating a configuration example of a liquid discharge head according to a modification.

FIG. 15 is a diagram illustrating a configuration example of the liquid discharge head 119 according to a modification.

As illustrated in FIG. 15, a liquid discharge head 119a and a liquid discharge head 119b are mounted on the carriage 118. The liquid discharge head 119a and the liquid discharge head 119b are arranged such that part of the nozzles overlap in the main scanning direction. FIG. 15 illustrates an example in which six nozzles of the liquid discharge head 119*a* and the liquid discharge head 119*b* overlap each other. That is, the number of overlapping nozzles is "6". Note that the number of overlapping nozzles is not limited to "6". Such a liquid discharge head 119 can be used to realize the processing described in the above embodiment.

In the modification, the liquid application surface is formed on the medium P according to each piece of pattern data in the case where the number of overlapping nozzles illustrated in FIG. 9 is only one (for example, the number of overlapping nozzles is only u). The other processes can be realized similarly to the processes described in the above embodiments.

Information including processing procedures, control procedures, specific names, various types of data, parameters, or the like illustrated in the above documents, drawings, or the like can be arbitrarily changed unless otherwise specified. Each constituent element of the illustrated apparatus is functionally conceptual and does not necessarily need to be physically configured as illustrated in the drawings. That is, specific forms of distribution or integration of apparatuses are not limited to the specific forms illustrated in the drawings, and all or a part of the apparatuses may be distributed or integrated functionally or physically in arbitrary units according to various burdens, usage situations, or the like.

The processing method determining program to be executed by the processing method determining apparatus 200 may be provided by being recorded in a recording medium that can be read by a computer such as a CD-ROM, a flexible disk (FD), a CD-R, or a DVD as a file in installable format or executable format, as one mode. The processing method determining program executed by the processing method determining apparatus 200 may be stored on a computer connected to a network such as the Internet and provided by being downloaded via the network. The processing method determining program executed by the processing method determining apparatus 200 may be provided or distributed via a network such as the Internet. The processing method determining program may be provided by being incorporated in a ROM or the like in advance.

The processing method determining program executed by the processing method determining apparatus 200 has a module configuration including each of the units (the acquiring unit 251 and the determiner 252) described above. As actual hardware, a CPU (processor) reads the processing method determining program from a storage medium and executes the program, so that the each of the units is loaded on the main storage device, and the acquiring unit 251 and the determiner 252 are generated on the main storage device.

The liquid discharge apparatus 100 described in the above embodiments includes a liquid discharge head or a liquid discharge unit, and is a device that drives the liquid discharge head to discharge liquid. Examples of the liquid discharge apparatus include not only an apparatus that can discharge liquid to a liquid adherable material but also an apparatus that discharges liquid towards air or liquid.

The liquid discharge apparatus 100 described as above may include a unit related to feeding of a liquid adherable material, conveying, and sheet ejection, a preprocessing device, a post-processing device, or the like.

For example, as the liquid discharge apparatus 100, there are an image forming apparatus that is an apparatus that discharges ink to form an image on paper, and a stereoscopic modeling apparatus (three-dimensional modeling apparatus) that discharges modeling liquid onto a powder layer in which powder materials are formed in a layered shape in order to mold a stereoscopic modeling object (three-dimensional modeling object).

The liquid discharge apparatus 100 is not limited to one with which significant images such as letters, graphics, or the like is visualized by discharged liquid. For example, one that forms a pattern or the like that itself has no meaning, and one that molds a three-dimensional image are included.

The above-mentioned "liquid adherable material" means one to which liquid can be adhered at least temporarily, adhered and fastened, adhered and permeated, or the like. Specific examples include a recording medium such as paper, a recording sheet, recording paper, a film, or a cloth, an electronic component such as an electronic substrate or a piezoelectric element, and a medium such as a powder material layer (powder layer), organ model, or an inspection cell, and unless specifically limited, include everything to which liquid adheres.

The material of above-mentioned "liquid adherable material" may be any material such as paper, thread, fiber, cloth, leather, metal, plastic, glass, wood, ceramics or the like as long as liquid can adhere to the material even temporarily.

The discharged liquid may be any liquid having viscosity and surface tension with which discharge can be performed from the head, and is not particularly limited. However, it is preferable that the liquid has viscosity of 30 mPa·s or less at ordinary temperature and ordinary pressure or by heating and cooling. More specifically, the liquid is solution, suspension, emulsion, or the like including a solvent such as water or an organic solvent, a colorant such as a dye or a pigment, a functionalizing material such as a polymerizable compound, a resin or a surfactant, a biocompatible material such as deoxyribonucleic acid (DNA), amino acid, protein, or calcium, an edible material such as a natural pigment, and the like, which can be used, for example, as formation liquid of an inkjet ink, a surface treatment liquid, constituent elements of an electronic element or a light-emitting element, and an electronic circuit resist pattern, three-dimensional modeling material solution, or the like.

As the liquid discharge apparatus 100, there is an apparatus in which a liquid discharge head and a liquid adherable material move relative to each other, but this is not a limitation. Specific examples include a serial type apparatus that moves the liquid discharge head, a line type apparatus that does not move the liquid discharge head, or the like.

As the liquid discharge apparatus 100, there are also a treatment liquid application apparatus that discharges treatment liquid onto paper in order to apply the treatment liquid to the surface of the sheet for the purpose of modifying the surface of the paper or the like, an injection granulation apparatus that granulates fine particles of a raw material by injecting a composition liquid in which raw materials are dispersed in a solution, through a nozzle, and the like.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus, comprising:
  a liquid discharge head configured to discharge liquid to an object to form a liquid application surface;
  a conveyance device configured to convey the object;
  an imaging device configured to capture a predetermined position of the object on which the liquid application surface is formed according to pattern data; and
  processing circuitry configured to
    control discharge of the liquid by the liquid discharge head according to the pattern data for forming the liquid application surface;
    control conveyance of the object by the conveyance device to form the liquid application surface corresponding to the pattern data; and
    determine a processing method of forming the liquid application surface according to a variance and a difference value between a maximum peak value and a minimum peak value in a feature quantity obtained from a captured image of the predetermined position captured by the imaging device.

2. The liquid discharge apparatus according to claim 1, wherein the processing circuitry is further configured to control the conveyance of the object by the conveyance device so that an overlapping portion where the liquid application surface partially overlaps another liquid application surface formed by continuous scanning of the liquid discharge head is formed,
  the imaging device is further configured to capture the predetermined position including the overlapping portion of the object on which the liquid application surface is formed, and
  the processing circuitry is further configured to determine the processing method of forming the liquid application surface by the liquid discharge head according to a captured image of the overlapping portion captured by the imaging device.

3. The liquid discharge apparatus according to claim 2, wherein the overlapping portion is formed by continuous scanning according to the pattern data including a mask in which dot generation rates are different and dots are randomly generated.

4. The liquid discharge apparatus according to claim 3, wherein the mask has a width in a main scanning direction equal to or more than a predetermined multiple of a width in a sub-scanning direction.

5. The liquid discharge apparatus according to claim 1, further comprising a plurality of liquid discharge heads, including the liquid discharge head, arranged so that nozzles partially overlap in a main scanning direction.

6. A processing method determining apparatus, comprising:
  processing circuitry configured to
    acquire captured images obtained by capturing a predetermined position of an object on which a liquid application surface is formed according to pattern data; and
    determine a processing method of forming the liquid application surface according to a variance and a difference value between a maximum peak value and a minimum peak value in a feature quantity obtained from a captured image of the predetermined position.

7. A non-transitory recording medium storing a plurality of instructions which, when executed by processing circuitry, cause the processing circuitry to perform a method, comprising:
  acquiring captured images obtained by capturing a predetermined position of an object on which a liquid application surface is formed according to pattern data; and
  determining a processing method of forming the liquid application surface according to a variance and a difference value between a maximum peak value and a minimum peak value in a feature quantity obtained from a captured image of the predetermined position.

* * * * *